April 11, 1939.  G. LEVEY  2,154,245
COUPLING FOR REPLACING DRIVE SHAFTS OF NO-DRAFT
WINDOW REGULATORS FOR MOTOR VEHICLES
Filed March 11, 1938  2 Sheets-Sheet 1
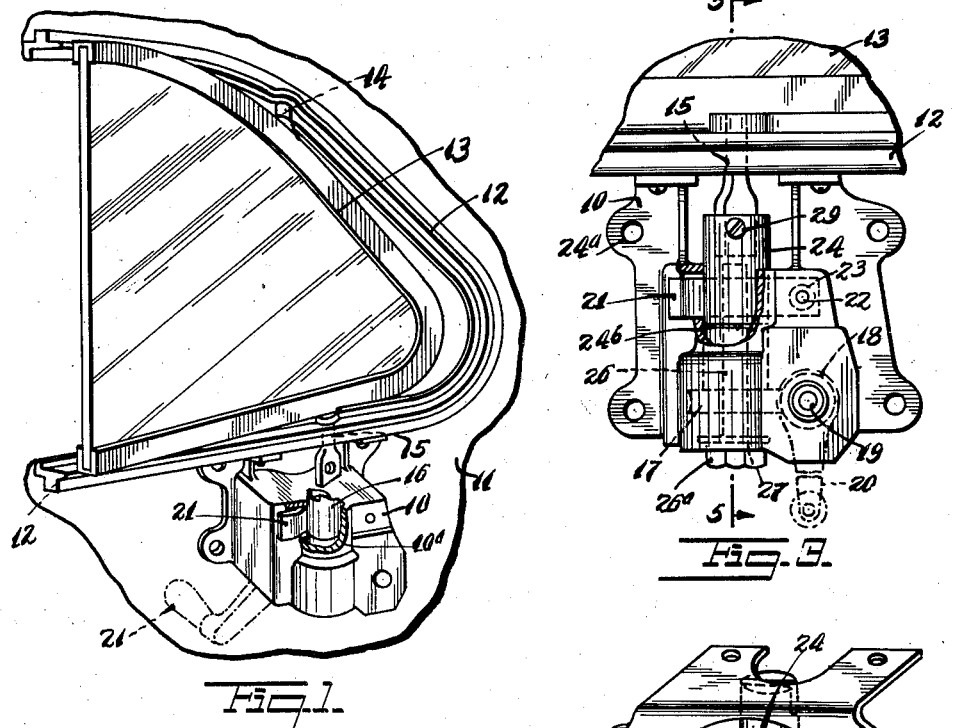
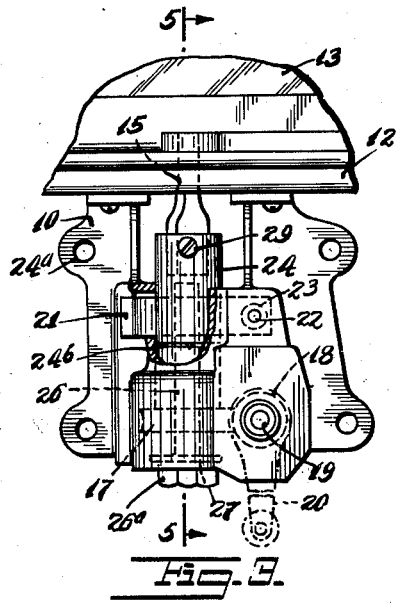
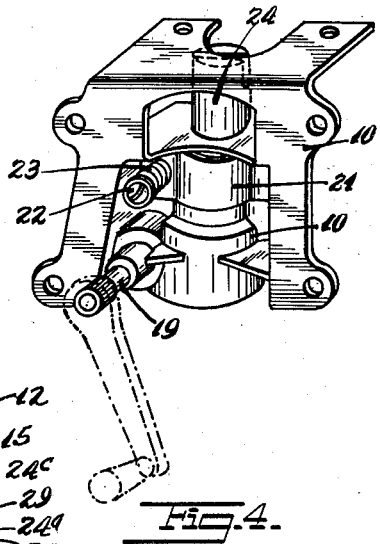
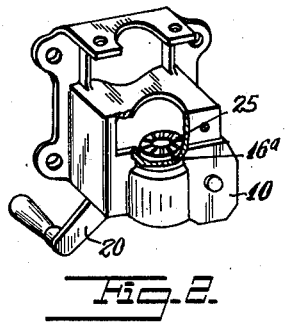
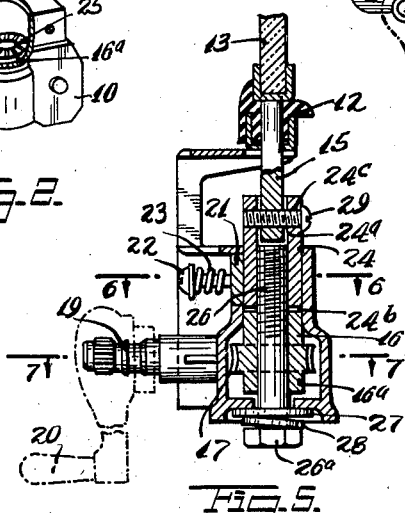
INVENTOR
Gustave Levey
BY
ATTORNEY April 11, 1939.　　　　　G. LEVEY　　　　　2,154,245
COUPLING FOR REPLACING DRIVE SHAFTS OF NO-DRAFT
WINDOW REGULATORS FOR MOTOR VEHICLES
Filed March 11, 1938　　　2 Sheets-Sheet 2

INVENTOR
Gustave Levey
BY
ATTORNEY

Patented Apr. 11, 1939

2,154,245

UNITED STATES PATENT OFFICE 2,154,245

COUPLING FOR REPLACING DRIVE SHAFTS OF NO-DRAFT WINDOW REGULATORS FOR MOTOR VEHICLES

Gustave Levey, New York, N. Y.

Application March 11, 1938, Serial No. 195,250

6 Claims. (Cl. 268—119)

This invention relates to a method and coupling for replacing drive shafts of no-draft window regulators for motor vehicles.

When the owner or operator of an automobile has lost his key or locked the key inside the automobile, one way to gain access to the ignition lock was for him to pry the no-draft window open. These no-draft windows are pivotally supported by means of trunnion elements located at the top and bottom thereof. The bottom trunnion element is connected with a hollow stem extending into a housing having worm gears which are adapted to be rotated for opening and closing the window. These worm gears naturally lock together and prevent the window from easily being opened and when the window is forced the hollow stem breaks off necessitating the replacement of the entire gear mechanism. Also, the lower trunnion twists. When an attempt is made to twist the trunnion back to its original position it breaks off.

The coupling according to this invention, is characterized by an adaptor stem which is provided at one of its ends with a slot into which the lower trunnion element may be inserted and fixedly attached thereto so that when the adaptor stem is rotated the window will be opened or closed.

Another object of this invention is to provide a means for fixedly attaching the adaptor stem to the hollow stem of the gear turning mechanism after the broken portion has been removed therefrom, so that the new adaptor stem is in aligned position with the twisted position of the lower trunnion.

Another object of this invention is to provide the bottom end of the adaptor with hardened teeth of a particular formation and which are adapted to grip in and engage niches thus formed on the upper end of the remaining portion of the stem for preventing the adaptor stem from rotating upon the remaining portion of the hollow stem.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a no-draft window having a gear turning mechanism associated therewith.

Fig. 2 is a perspective view of the gear turning mechanism after the broken portion of the hollow stem has been removed therefrom.

Fig. 3 is an elevational view of the gear turning mechanism after an adaptor stem, according to this invention has been applied thereto.

Fig. 4 is a perspective view of Fig. 3.

Fig. 5 is a sectional view on the line 5—5 of Fig. 7.

Figure 6:
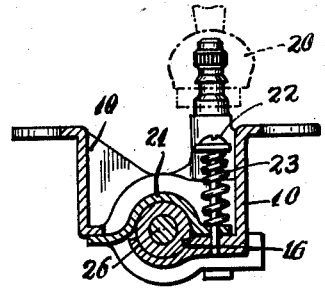
Fig. 6 is a sectional view on the line 6—6 of Fig. 5.
Figure 8:
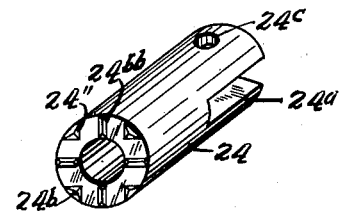
Fig. 8 is a perspective view of the adaptor stem per se.
Figure 7:
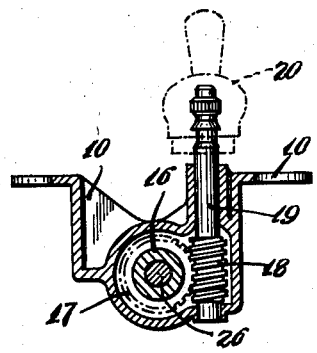
Fig. 7 is a sectional view on the line 7—7 of Fig. 5.
Figure 9:
Fig. 9 is a perspective view of the lock washer per se.
Figure 10:
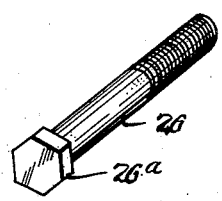
Fig. 10 is a perspective view of the bolt per se.

The method and coupling for replacing drive shafts of no-draft window regulators for motor vehicles, according to this invention, is to be used in conjunction with a gear turning mechanism including a body 10 which is mounted upon a portion of the car door 11. The car door 11 is provided with a no-draft window opening 12 and a no-draft window 13 of conventional construction, is mounted within the window opening 12. At its upper end the window has a trunnion element 14 which engages a complementary opening formed in the edge of the window opening for pivotally supporting the top portion of the window. At its bottom edge the window 13 has a bottom trunnion element 15 which extends through an opening formed in the frame of the window opening 12 and extends into the door 11. The lower end of the trunnion element 15 is fixedly attached to the hollow stem 16 of the gear turning mechanism. The hollow stem 16 extends into the body 10 of the gear turning mechanism and has a gear 17 which meshes with a complementary horizontal worm gear 18. The horizontal worm gear 18 has a shaft 19 which extends to the outer side of the body 10 and which has a handle 20 supported upon its outer end which is adapted to be manually turned for rotating the hollow stem 16 to open or close the no-draft window 13.

A clamp 21 is mounted within the body 10 and extends around the hollow stem 16. A screw 22 passes through an opening formed in one end of the clamp 21 and threadedly engages an opening formed in the body 10. An expansion spring 23 is coaxially mounted on the screw 22 and acts between the clamp 21 and the head of the screw for resiliently urging the clamp 21 against the hollow stem 16. This clamp together with the gears 17 and 18 normally holds the no-draft window 13 in its closed position to prevent it from rattling.

When the window 13 is forced, one of two things generally happens. The hollow stem 16 will not rotate and it is usually broken off at the point where the trunnion element 15 is connected therewith. If the hollow stem does not break but the trunnion is twisted, the window cannot be snugly closed and when an attempt is made to restore the trunnion to its normal position by forcing it in the other direction, the trunnion breaks off, and it is impossible to again connect the trunnion element therewith.

The adaptor stem 24 comprises a piece of tubular material which is formed at one of its ends with a slot 24ª into which the trunnion element 15 may be engaged regardless of the condition of trunnion 15. At the other of its ends it is formed with hardened teeth 24ᵇ. To engage this adaptor stem upon the hollow stem 16 of the gear turning mechanism, a portion 10ª of the body 10 is broken or sawed away, as shown in Fig. 1. It is then possible to remove the jagged end of the hollow stem 16 by sawing half way through the stem in an even plane, and then turning the stem around to expose the portion which has not been sawed, and then one may saw in the remaining distance for completely removing the broken jagged portion. The remaining portion 16ª of the hollow stem 16 (see Fig. 2) is then formed with a plurality of niches 25 which are adapted to cooperate with the teeth 24ᵇ for holding the stem and the adaptor stem 24 together as a rigid unit.

The adaptor stem 24 is rested on the stem 16 with the teeth 24ᵇ and the niches 25 inter-engaging with each other. A bolt 26 is passed through the stem 16 and threadedly engage into the bottom end of the adaptor stem 24 for holding it in position thereon. A washer 27 is engaged upon the screw 26 and abuts against the bottom end of the hollow stem 16 for preventing the head 26ª of the screw 26 from passing through this hollow stem. A lock washer 28 is engaged between the head 26ª and the washer 27 for resiliently urging the bottom end of the adaptor stem 24 against the niches 25 for holding the teeth 24ᵇ in position with the niches 25. The trunnion element 15 is then engaged into the slot 24ª and a screw 29 is passed through the openings 24ᶜ formed in the end of the adaptor stem 24 and the trunnion element 15.

The teeth 24ᵇ are formed in such a manner that there are four elongated teeth 24ᵇᵇ which extend radially from the center of the adaptor stem 24 which have diamond shaped teeth 24″. Thus the elongated teeth 24ᵇᵇ are alternated with the diamond shaped teeth 24″. When these teeth engage the niches 25 formed upon the end of the adaptor stem 16 they rigidly extend into the niches for preventing the adaptor stem from rotating upon the end of the stem 16, since the teeth of the adaptor stem 24 are hardened and the engaged stem 16 of the turning mechanism is usually made of white metal which is softer than the hardened teeth of the adaptor stem 24.

Figure 11:
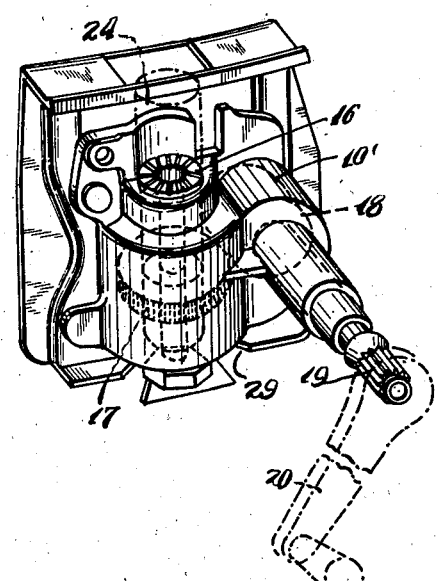
Fig. 11 is a perspective view of a gear turning mechanism of a slightly different formation.
Figure 12:
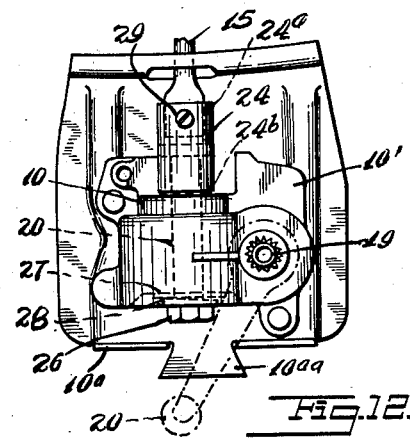
Fig. 12 is an elevational view of the gear turning mechanism having an adaptor stem, according to this invention, applied thereto.

In Figs. 11 and 12 a different type of gear mechanism is shown which has an adaptor stem 24 applied to the body 10' of the gear turning mechanism in a slightly different manner. The body 10' is formed to engage around the gears 17 and 18 and is not of the box formation which was shown in Fig. 1. It is not necessary to break away any of the body 10' when sawing off the broken portion of the stem 16. Instead, the stem is sawed off by merely sawing half way through and then turning the stem through 180° to expose the unsawed portion so that this portion may also be sawed for removing the broken and jagged end.

The casing 10' is formed at the bottom with an outwardly extending flange 10 and it is necessary that two inwardly extending slits 29 be formed in this flange 10ª at either side of the open end of the stem 16 so that the portion 10ᵃᵃ which is separated from the flange 10ª by the slits may be bent downward to permit the screw 26 to be passed through the stem 16. In other respects this form of the invention is similar to the previous form.

It is to be understood that this adaptor is to be used for either right or left drive mechanism for no-draft windows.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A coupling for replacing drive shafts of no-draft window regulators for motor vehicles, comprising an adaptor stem for engagement coaxially on the hollow stem of a gear turning mechanism for no-draft windows, hardened teeth on the end of said adaptor stem engaging said hollow stem, and a bolt engaging through said hollow stem and threadedly connected with said adaptor stem for rigidly connecting these parts.

2. A coupling for replacing drive shafts of no-draft window regulators for motor vehicles, comprising an adaptor stem for engagement coaxially on the hollow stem of a gear turning mechanism for no-draft windows, hardened teeth on the end of said adaptor stem engaging said hollow stem, and a bolt engaging through said hollow stem and threadedly connected with said adaptor stem for rigidly connecting these parts, said adaptor stem being formed from steel or other material and having a slot extending inwards from its top end and into which the bottom trunnion of the no-draft window is adapted to be extended for fixedly connecting these parts together.

3. A coupling for replacing drive shafts of no-draft window regulators for motor vehicles, comprising an adaptor stem for engagement coaxially on the hollow stem of a gear turning mechanism for no-draft windows, hardened teeth on the end of said adaptor stem engaging said hollow stem, and a bolt engaging through said hollow stem and threadedly connected with said adaptor stem for rigidly connecting these parts, said hardened teeth comprise elongated teeth extending radially therefrom and to the periphery thereof, and diamond-shaped teeth interposed between each of said elongated teeth in such a manner that said elongated teeth and said diamond-shaped teeth are alternated with each other.

4. A coupling for replacing drive shafts of no-draft window regulators for motor vehicles, comprising an adaptor stem for engagement coaxially on the hollow stem of a gear turning mechanism for no-draft windows, hardened teeth on the end of said adaptor stem engaging said hollow stem, and a bolt engaging through said hollow stem and threadedly connected with said adaptor stem for rigidly connecting these parts, said hardened teeth comprise elongated teeth extending radially therefrom and to the periphery thereof, and diamond-shaped teeth are alternated with each other, a washer on said bolt engaging against the bottom end of said hollow stem, and a lock washer engaged between said washer and the head of said bolt for resiliently urging said hardened teeth against complementary niches formed in the adjacent face of said stem for preventing said adaptor stem from rotating upon the end of said hollow stem, said hollow stem of the gear turning mechanism being made of a relatively softer metal than the hardened teeth of the said adaptor permitting the cutting in of the teeth into the said lower stem when the bolt is tightened.

5. A coupling for replacing drive shafts of no-draft window regulators for motor vehicles, comprising an adaptor stem for engagement coaxially on the hollow stem of a gear turning mechanism for no-draft windows, hardened teeth on the end of said adaptor stem engaging said hollow stem, and a bolt engaging through said hollow stem and threadedly connected with said adaptor stem for rigidly connecting these parts, said hollow stem having its hollow extending axially therethrough so that said bolt may be easily passed therethrough for engaging the end of said adaptor stem.

6. A coupling for replacing drive shafts of no-draft window regulators for motor vehicles, comprising an adaptor stem for engagement coaxially on the hollow stem of a gear turning mechanism for no-draft windows, hardened teeth on the end of said adaptor stem engaging said hollow stem, and a bolt engaging through said hollow stem and threadedly connected with said adaptor stem for rigidly connecting these parts, said hollow stem being mounted within a body and having a portion thereof extending from said body and upon which said adaptor stem is mounted.

GUSTAVE LEVEY.